April 11, 1944.　　W. H. SILVER　　2,346,514
CLUTCH MECHANISM
Filed May 5, 1941　　3 Sheets-Sheet 1
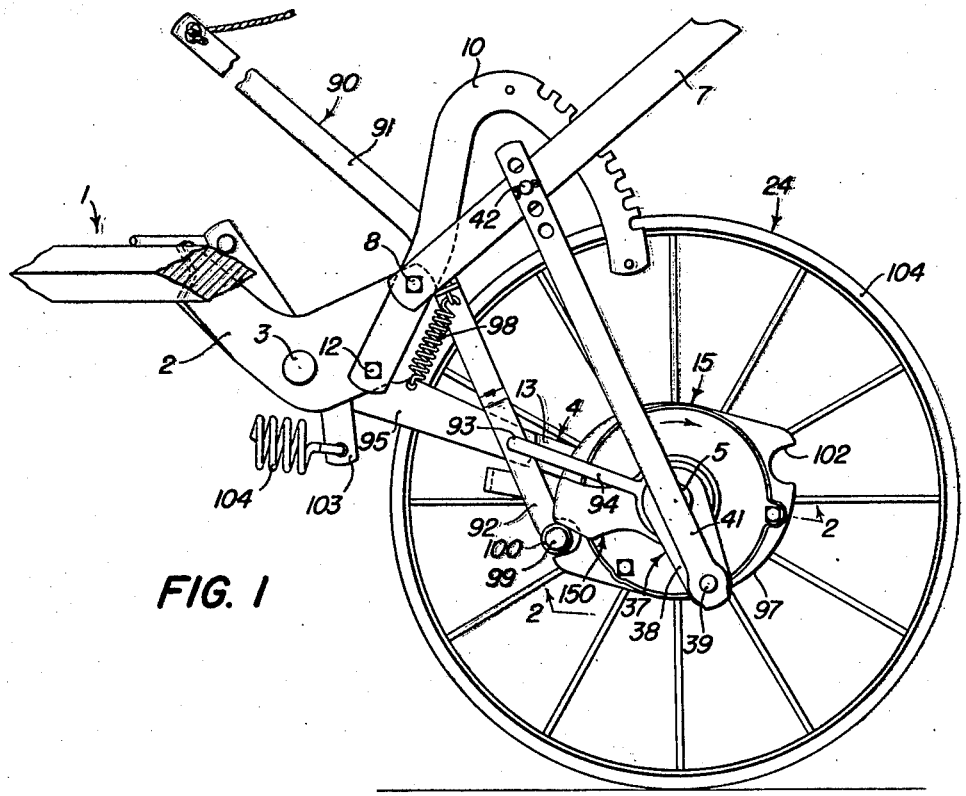
FIG. 1
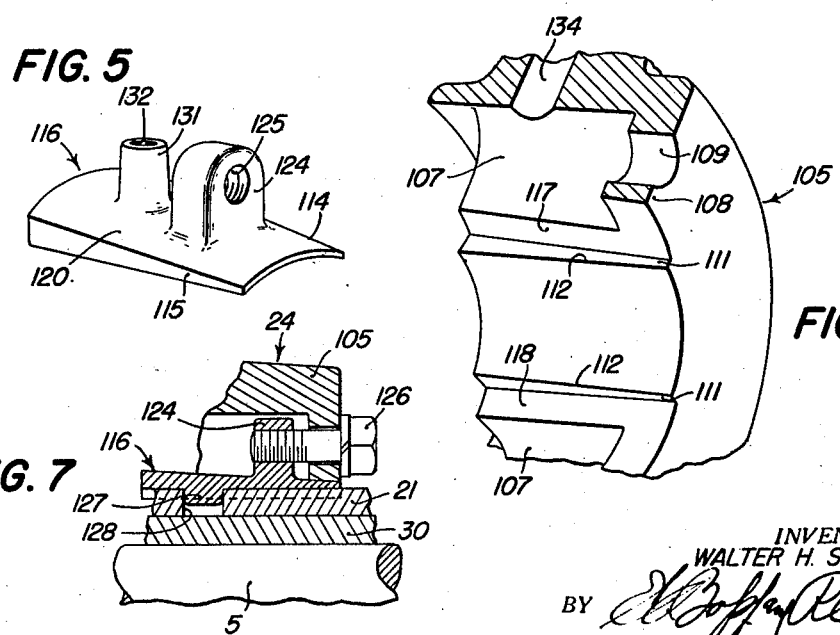
FIG. 5
FIG. 6
FIG. 7
INVENTOR:
WALTER H. SILVER
BY
ATTORNEYS.

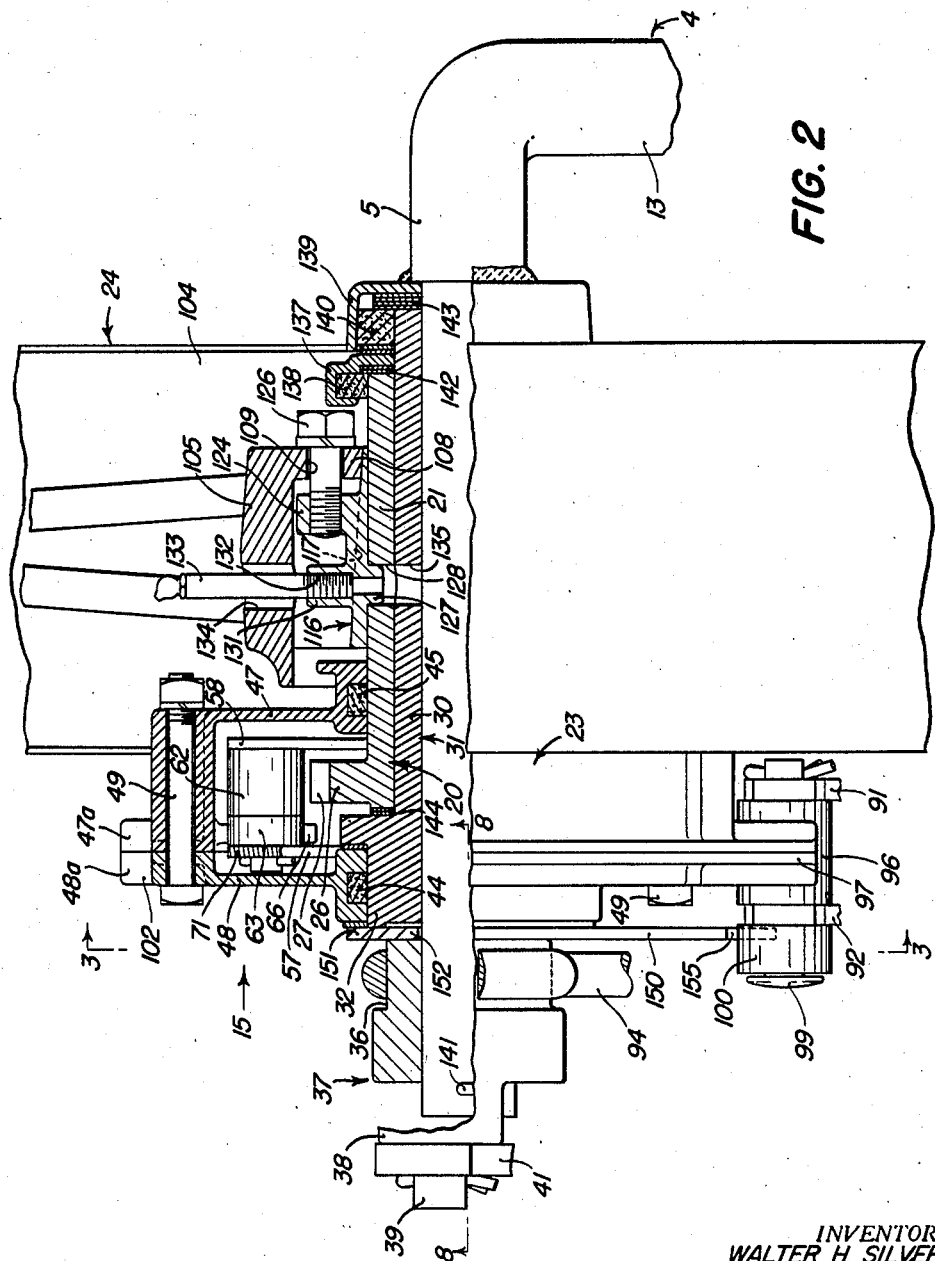

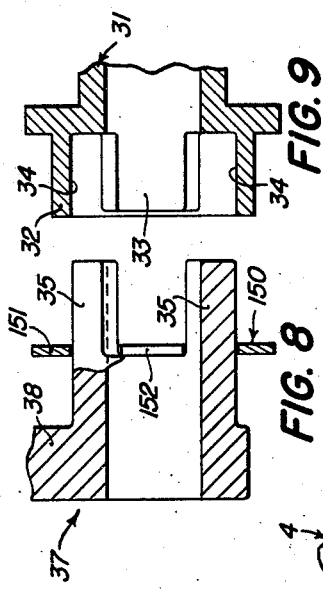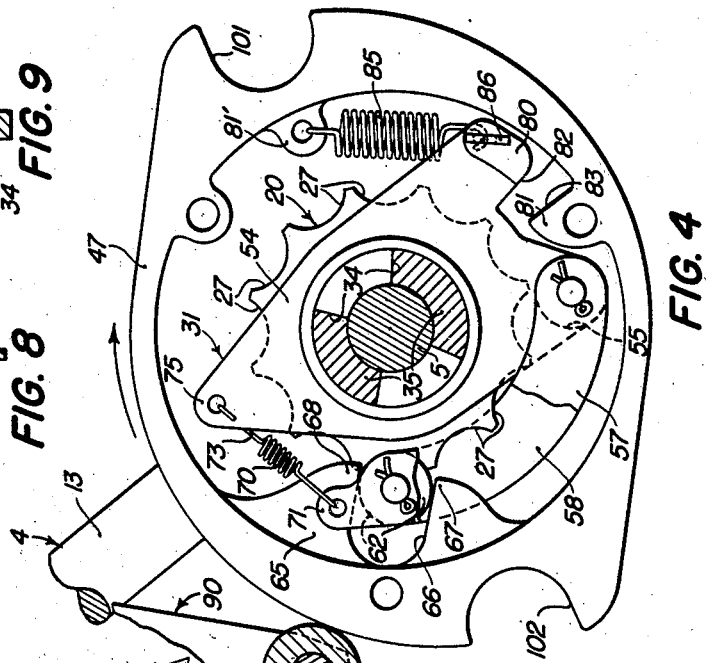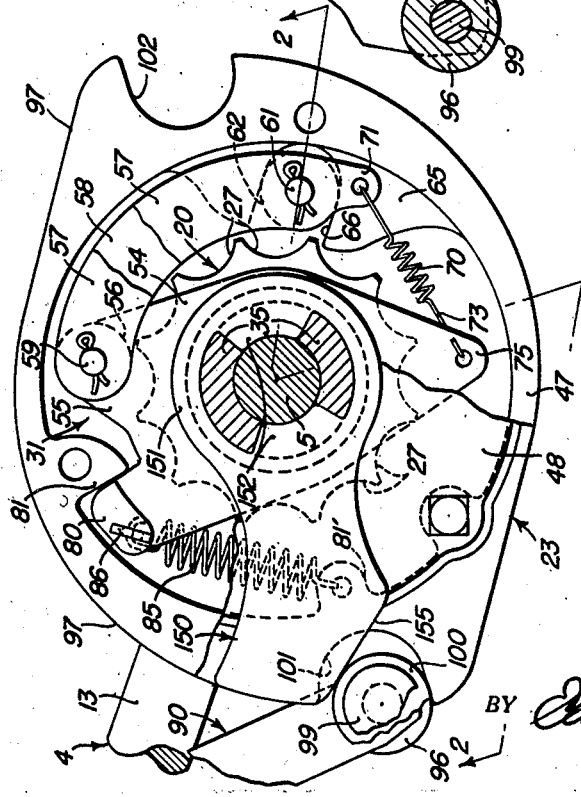

Patented Apr. 11, 1944

2,346,514

UNITED STATES PATENT OFFICE 2,346,514

CLUTCH MECHANISM

Walter H. Silver, Moline, Ill., assignor to Deere & Company, Moline, Ill., a corporation of Illinois Application May 5, 1941, Serial No. 391,918

23 Claims. (Cl. 192—62)

The present invention relates generally to self-interrupting clutch mechanisms for agricultural implements and the like and is particularly concerned with clutches of the half-revolution type arranged to raise and lower the tools or other parts of an agricultural implement. Generally speaking, this invention is in the nature of an improvement on the clutch mechanism shown in the co-pending application filed June 17, 1940, by Carl G. Strandlund, Serial No. 340,925.

The object and general nature of the present invention is the provision of a clutch mechanism for agricultural machines and the like in which the clutch parts are enclosed in a casing and in which the casing itself serves as at least a part of the means controlling the engagement and disengagement of the clutch driving and driven parts. It is a feature, therefore, of the present invention to provide a clutch of this type in which the construction is simplified and in which there are relatively fewer parts than in prior clutches, yet practically all movable parts of the clutch are enclosed in a lubricant-tight and dust and dirt-proof casing.

Another feature of the present invention is the provision of a clutch of the enclosed type particularly constructed and arranged to be mounted on a swinging crank axle of the type in which the driving or supporting ground wheel is mounted inside the crank portion of the crank axle, with the clutch mechanism and parts actuated thereby also disposed laterally inside of the crank portion of the crank axle and laterally inwardly of the driving ground wheel. Another feature of this invention resides in the provision of driving and driven clutch members adapted to be connected together by a shiftable part, the position of which is controlled by a casing that encloses the parts, with means exteriorly of the casing for engaging and releasing the same to thereby control the engagement and disengagement of the clutch. Still further, it is a feature of this invention to provide means on the interior of the casing providing for a limited amount of movement of one of the clutch parts, preferably the driven part, whereby when the casing itself is held against movement, the driven part of the clutch, together with the implement parts connected therewith, are locked against movement, and an additional feature of this invention is the provision of means whereby locking the casing against movement, as just mentioned, results in disengaging the clutch and permitting the driving member of the clutch to rotate freely relative to the driven member which is locked against rotation, as aforesaid.

Still another feature of the present invention resides in improved means for securing the ground wheel to the driving member of the clutch, whereby the means for connecting the ground wheel to said driving member does not interfere with the assembly or disassembly of the clutch mechanism or the lubricant-tight sealing engagement between the controlling casing and the driving and driven parts of the clutch.

These and other objects and advantages of the present invention will be apparent to those skilled in the art after a consideration of the following detailed description, taken in conjunction with the accompanying drawings illustrating the preferred form of this invention.

In the drawings:

Figure 1 is a side view of a part of an agricultural implement having a crank axle, a land wheel and clutch mechanism constructed and arranged according to the principles of this invention;

Figure 2 is a sectional view taken generally along the line 2—2 of Figures 1 and 3;

Figure 3 is a sectional view taken generally along the line 3—3 of Figure 2, with the cover broken away, showing the construction and arrangement of the clutch parts when the implement is in its lowered or operating position;

Figure 4 is a sectional view similar to Figure 3 but showing the parts of the clutch mechanism in the positions they occupy when the rotation of the ground wheel is moving the implement into its raised or transport position;

Figure 5 is a perspective view of one of the taper locks forming a part of the means for fixing the ground wheel to the driving part of the clutch mechanism;

Figure 6 is a fragmentary perspective view of the hub of the ground wheel, showing the means by which the wheel is clamped in driving relation to the driving member of the clutch mechanism;

Figure 7 is a detail section of one of the wheel clamping blocks; and

Figures 8 and 9 are sections taken substantially along the line 8—8 of Figure 2, illustrating the separable connection between the lifting crank and the driven part of the clutch.

Referring now to the drawings, more particularly to Figures 1 to 3, the reference numeral 1 indicates the frame of the implement. The frame 1 includes suitable bearing or bracket means 2 by which the upper end 3 of a crank axle 4 is received for generally vertical swinging movement relative to the frame 1. The axle section of the crank axle 4 is indicated by the reference numeral 5 and receives the land wheel and clutch mechanism to which reference will be made below. A depth adjusting lever 7 is pivoted on a bolt 8 on the bracket 2, and carries suitable detent means by which the lever may be latched to a sector 10 that is bolted, as at 8 and 12, to the frame bracket 2. If desired, the depth adjusting mechanism may be like that shown in my prior Patent No. 2,192,333, issued March 5, 1940. The crank section of the crank axle 4 is indicated by the reference numeral 13 and serves to connect the crank axle sections 3 and 5, the crank axle section 13 extending downwardly and forwardly as is conventional in this and other kinds of farm machines. The axle section 5 of the crank axle 4 receives a ground wheel which, through suitable clutch mechanism, serves to drive a crank which is connected with the depth adjusting arm 7, whereby at the option of the operator power derived from the land wheel may be employed for swinging the crank axle 4, thereby serving to raise and lower the tools.

The present invention is particularly concerned with new and useful improvements in clutch mechanism for this purpose, and the clutch, which is indicated in its entirety in Figure 1 by the reference numeral 15, will now be described. In general, the clutch 15 comprises driving and driven parts which are adapted to be connected together by self-interrupting means which is under the control of a rockable casing which serves the dual purpose of controlling the clutch and also enclosing and protecting all operating parts of the clutch from dust, dirt and the like and the casing also serves to retain lubricant whereby the parts are adequately lubricated at all times, irrespective of the conditions under which the machine is operated.

Referring now more particularly to Figures 2 and 3, the driving or active member of the clutch is indicated by the reference numeral 20 and comprises a relatively long sleeve 21 disposed about the axle section 5 of the crank axle 4 and extending outwardly of a rockable casing 23 at one end, this end of the sleeve 21 receiving the land wheel 24 by means which will be described later. The inner end of the sleeve 21 is formed with a radial flange 26 which is provided with a peripheral series of radially outwardly facing external scallops or notches 27. The driving member 20 of the clutch is journaled for rotation on a sleeve 30 which forms a part of the driven or inactive member 31 of the clutch. The sleeve 30 is supported for rotation on the axle section 5 and not only receives and supports the driving sleeve 21 but extends outwardly of the casing 23 at the opposite side thereof, as indicated by the reference numeral 32. As best shown in Figure 9, this portion of the driven member 31 is formed with a pair of oppositely disposed lugs 33. The spaces between the lugs 33 forms a pair of sockets 34 in which is received, respectively, a pair of lugs 35 formed on the hub 36 of a crank member 37, the latter also being mounted for rotation on the axle section 5 of the crank axle 4. As best shown in Figures 3 and 4, the lugs 35 are of unequal size, and the same is true of the lugs 33 and sockets 34, so that the crank member 37 can be applied only in the correct position. The crank member 37 includes a crank 38 which is apertured at its outer end to receive a pivot 39 to which a link 41 is connected at its lower end. The upper end of the link 41 is pivoted, as at 42, to the depth adjusting arm 7. Suitable sealing means 44 and 45 is carried by the opposite side walls of the casing 23 and contacts the hub portions of the driving and driven clutch members 20 and 31, respectively. Preferably, the casing 23 is formed of two parts 47 and 48, operatively connected together by three bolts 49.

As best shown in Figures 3 and 4, the driven member 31 of the clutch is provided with a flange section 54, one part of which is extended to form an arm 55 that carries an apertured boss 56. A pair of roller supporting straps 57 and 58 are connected by a pivot pin 59 to the apertured boss 56 and extends generally circumferentially across the scalloped portion 27 of the driving clutch member 26. The other ends of the roller supporting members 57 and 58 carry a pivot pin 61 upon which a pair of rollers 62 and 63 are mounted. The roller 62 is the longer of the two and is adapted to enter any one of the notches or scallops 27, as will be clear from Figure 2. The roller 63 is disposed in a plane toward the crank side of the scalloped member 26, and in this plane the member 47 of the casing 23 carries a radially inwardly directed web 65 which is slotted, as at 66, so that the ends 67 and 68 are disposed about the roller 63 on opposite sides thereof. The slot 66 in the web 65 extends radially outwardly to a point fairly close to the peripheral portion of the casing. The roller supporting straps 57 and 58 are, as described above, free to swing about the pivot 59 so as to carry the roller 62 toward and away from the scalloped member 26. The slot 66 extends in a radial direction but embraces the roller 62 as aforesaid. Therefore, whenever the casing 23 is rocked relative to the driven member 31, to which the roller supporting straps 57 and 58 are pivoted, the roller is moved in one direction or the other. Normally, however, relatively light spring means 70 is connected between the outer end of at least one of said strap members and the driven clutch member 31 and urges the roller toward engagement with the scalloped member 26. Preferably, the roller supporting strap 57 is extended, as at 71, and is apertured to receive one end 72 of the spring, the other end 73 of the spring being anchored to an arm section 75 which extends from the flange 54 of the driven clutch member 31, in a position generally diametrically opposite the arm 55.

The flanged section 54 of the member 31 is provided with a lug 80, and a companion lug 81 is formed on the section 47 of the casing 23. These lugs have engaging faces 82 and 83, respectively, and the lugs 80 and 81 are constructed and arranged so that when the casing 23 moves relative to the member 31 into a position in which the roller 62 lies in the outer end of the slot 66 and out of engagement with the scalloped section 27, the lugs 80 and 81 are in engagement. A relatively heavy spring 85 is anchored at one end to the lug 81' and at the other end is connected with the lug 80 of the member 31 by a cotter 86. The function of the spring 85 is to shift the casing 23 relative to the driven member 31 of the clutch, whenever the casing 23 is free to rock.

The movement of the casing 23 is controlled by a trip lever 90 which comprises a member 91 having at its lower end a hammer strap 92. The lever 90 is pivoted on the inwardly turned end 93 of a link 94 which, with a bracket 95 that is welded or otherwise fixed to the inner end 3 of the crank axle 4, serves as a tie bar between the hub of the crank member 37 and the journal section 3 of the crank axle 4. The trip lever 90 at its lower end carries a roller 96 which rides along the periphery 97 of the casing 23. A spring 98 is connected with the trip lever 90 and urges the roller 96 against the periphery of the casing 23. The roller 96 is mounted on a pin 99 carried by the trip lever, and the pin 99 also carries a second roller 100 which serves as a part of clutch locking means described below. The spring 98 acts to cause the roller to enter one or the other of a pair of notches 101 and 102 formed in the periphery of the casing 23. A second bracket 103 is fixed to the first bracket 95 and receives an assisting spring 104.

As mentioned above, the land wheel 24 is arranged to be connected in driving relation with the driving member 20 of the clutch 15. The land wheel 24 includes a hub 105 which, as shown in Figure 6, is formed with a plurality of axially directed recesses 107 which are open at one end and at the other end terminate in a flange 108 which is apertured, as at 109. The radially inner edge of the flange or wall 108 is recessed, as at 111, to provide a pair of shoulders 112 which are adapted to engage opposite edges 114 and 115 of a tapered block member 116 (Figure 5). The wheel hub construction just described also provides ledges 117 and 118 which, as best shown in Figure 2, are tapered in an axial direction, corresponding in degree of taper to the exterior surface 120 (Figure 6) of the tapered block 116, upon which the ledges 117 and 118 are adapted to seat. Preferably, there are a plurality of tapered blocks 116 and each is provided with a lug 124 which is apertured, as at 125, and tapped to receive a clamping cap screw 126 (Figure 2) which is adapted to be inserted through the opening 109 of the wall 108. Also, each tapered block 116 is provided with a radially inwardly directed lug 127 (see Figure 7) which is adapted to be inserted into an opening 128 formed in the sleeve section 21 of the driving clutch member 20. The latter has as many openings as there are tapered blocks 116. As best shown in Figure 2, and to provide for lubrication, one of the tapered blocks 116 has a radially outwardly extending lug 131 aligned with the inner lug 127, and these aligned lugs 127 and 131 are provided with a bore, the outer end of which is threaded, as at 132, to receive a lubricant fitting 133 inserted through an opening 134 which is formed in the hub 105 of the land wheel 24. The parts are so arranged that when the lifting crank 37 lines up with the lubricant fitting 133, an opening 135 formed in the sleeve section 30 of the driven clutch member 31 comes into alignment with the bored lugs 127 and 131, whereby lubricant passes through to the bearing of the driven clutch member 31 on the axle section 5, as best shown in Figure 2. A dust cap 137 having sealing means 138 engaging the outer end of the driving clutch member 20 is disposed about the outer end of the sleeve section 30 of the driven clutch member 31. A second dust cap 139 is welded to the crank axle 4 and carries sealing means 140 sealing the outer end of the driven sleeve 30. The lifting crank 37 is held on the axle 4 by a cotter 141, and as best shown in Figure 2, this also holds the driving and driven clutch parts on the axle 4. Thrust rings or wearing washers 142 are disposed between the dust cap 137 and the laterally outer end of the sleeve section 21 of the driving clutch member 20, and similar wearing washers 143 are disposed between the outer end of the driven sleeve 30 and the cap 139. On the interior of the clutch, similar thrust washers 144 are disposed between the laterally inner end of the driving clutch member 20 and the flange section 26 of the driven clutch member 31. Wear in the clutch may readily be taken up by removing the cotter 141 and slipping the clutch parts off the axle and inserting additional thrust washers.

Referring now for the moment to Figure 1, it will be seen that the weight of the frame 1 and associated parts is carried by the link 41, in the lowered position of the crank axle 4, which exerts a downward thrust against the crank arm 38. Normally this weight acts to hold the crank against rotation, which thus holds the driven member 31 of the clutch in the position shown in Figure 3. The pivot 93 of the trip lever and the length of the section carrying the rollers 96 and 100 is so constructed that when these parts engage in the casing notch 101 (Figure 3) the casing is held in a position in which the clutch roller 62 is retained at the bottom of the slot 66 and out of engagement with the driving clutch member 20, this position being maintained against the tension of the springs 70 and 85. Under certain conditions, however, the weight of the implement frame may not be sufficient to prevent the springs 70 and 85 from rotating the crank 38, which is a part of the driven member 31, into a position permitting the roller 62 to move into or toward engagement with the scallops 27 on the driving clutch member 20. For example, this condition may be encountered if the implement tools encounter a hard spot and tend momentarily to raise the implement. If this should occur, the clutch may engage when it is not desired to have that occur. In order, therefore, to insure that when the parts are in the position shown in Figure 1 the clutch shall not engage unless the trip lever 90 is actually moved away from the notch 101, I provide a clutch lock which comprises a member 150 having a hub section 151 provided with an opening to receive the hub of the crank 37, the hub section 151 having radially inwardly extending lugs 152 which, as best shown in Figures 2 and 3, extend in between the axially directed lugs 35 on the crank member 37, whereby the clutch locking plate 150 is securely connected non-rotatably with the crank 37. The clutch locking plate 150 is provided with a cam section 155 which is disposed in a position partly overlying the casing notch 101. The cam section 155 is so angled that as the clutch in engaged relation moves into the position shown in Figure 1, the trip lever spring 98 forces the roller 96 into the notch 101 and at the same time shifts the clutch locking plate 150, and the crank 37 connected therewith, a relatively small angular amount in a clockwise direction sufficient to shift the driven member 31 of the clutch into a position in which the lug 80 engages the lug 81 while the roller 96 holds the casing 23 against rotation. At the same time that the roller 96 enters the notch 101, the roller 100 on the pin 99 acts against the locking plate 150. The spring 98 has an effective force greater than the springs 70 and 85. If desired, a locking plate similar to the locking plate 150 may be provided for cooperation with the roller 100 when the trip lever engages the opposite notch 102, which is in the raised position of the implement. However, it is generally not necessary to provide such locking means for the raised position of the implement, since in that position the full weight of the implement and tools is imposed on the crank, which is slightly past dead-center so that the weight of the implement and tools is effective to positively hold the driven clutch member 31 in a position up against the lug 81 while the trip lever, engaging the notch 102, holds the casing against rotation.

The operation of the power lift clutch described above is substantialy as follows:

Figures 1, 2 and 3 illustrate the parts in the positions they occupy when the implement is arranged for operation with the tools thereof in ground working position. Specifically, the crank 37 is disposed in a lower position, as best shown in Figure 1, which disposes the crank axle 4 in an upper position, relative to the frame 1. The depth of operation of the implement may be adjusted by rocking the depth adjusting lever 7 in one direction or the other, which raises or lowers the frame relative to the land wheel 24, as set forth in my prior patent identified above. When the implement is in operating position, the spring 98 holds the trip roller 96 in the notch 101, which prevents the casing 23 from rotating any farther in a clockwise direction as viewed in Figures 1 and 3. The trip lever spring 98 also forces the roller 100 against the plate 150, moving the latter into the position shown in Figure 3, whereby the clutch is positively locked in disengaged position, thus holding both the casing 23 and the crank 37 against further movement. When the clutch is in disengaged position, the relative positions of the casing 23 and crank 37 are such that the roller 62 is held at the outer end of the slot 66, and thus out of engagement with the scallops or notches 27 on the flange 26 of the driving clutch member 20. Thus, the land wheel 24 and the driving clutch member 20 rotate freely.

When the operator desires to lift the implement, he pulls on the cable connected to the outer end of the trip lever 90, swinging the roller 96 out of the notch 101 in the casing 23. The latter is thus free to rotate under the action of the spring 85, which is under tension as described above when the clutch is locked in its disengaged position. The casing 23 is therefore moved in a clockwise direction, the lug 81 moving away from the lug 80, and this relative movement of the casing 23 relative to the driven clutch member 31 causes the slot 66 to permit the roller 62 to be pulled into engagement with one of the notches or scallops 27, under the action of the spring 70. As soon as the roller 62 engages in one of the notches 27, there is then a driving connection established between the driving clutch member 20 and the driven clutch member 31, whereupon all of the parts, including the casing 23 will rotate, the spring 85 causing the casing 23 to follow the driven clutch member 31. However, as soon as the clutch is engaged, the operator releases his hold on the trip cable, and the trip lever 90 therefore moves the roller 96 back into engagement with the edge of peripheral surface 97 of the casing 23, so that as the rotation continues, the roller 96 engages or drops into the other casing notch 102, thereby terminating movement of the casing 23, preferably at a point where the crank 37 is just beyond its upper position so that the weight of the frame and associated parts acts against the crank 37 tending to rotate the same, together with the driven clutch member 31 in a clockwise direction, as viewed in Figures 3 and 4.

Since the reengagement of the trip lever 90 with the casing 23 terminates its movement, the continued movement of the driven clutch member 31 causes the roller 62 to be moved out of engagement with the notched member 26, thereby disconnecting the drive between the driving and driven clutch members. Thus, again the driving member of the clutch, together with the land wheel 24 which is connected thereto, is free to rotate without driving the crank 37, the engagement of the trip lever 90 with the casing acting through the lugs 89 and 81 to hold the implement frame in its raised or transport position, which, as described above, also holds the clutch roller 62 out of engagement with the notches on the member 26. Preferably, the peripheral section 97 where the slots or notches 101 and 102 are formed are flanged, as at 47a and 48a to provide adequate bearing for the trip roller 96, as best shown in Figure 2.

While I have shown and described above the preferred structure in which the principles of the present invention have been incorporated, it is to be understood that my invention is not to be limited to the particular means shown and described above, but that, in fact, widely different means may be employed in the practice of the broader aspects of my invention.

What I claim, therefore, and desire to secure by Letters Patent is:

1. In an agricultural implement, a power actuated shaft, lifting mechanism actuated by said shaft and including a shiftable part for controlling the operation of said mechanism, a casing movably disposed on said shaft, and a connection between said casing and said shiftable part whereby movement of said casing acts through said shiftable part for controlling said mechanism.

2. In an agricultural implement, mechanism including a normally rotatable element and a normally stationary element, means optionally connecting said elements, a casing for said mechanism and having limited movement relative to said stationary element, means connecting said casing with said first mentioned means whereby movement of said casing controls said connecting means, and means for causing said casing to shift relative to said stationary element through said range of limited movement.

3. In an agricultural implement, mechanism including a normally rotatable element and a normally stationary element, means optionally connecting said elements, a casing enclosing said mechanism and having limited movement relative to said stationary element, means connecting said casing with said connecting means whereby said casing controls said connecting means, and spring means extending between said casing and said normally stationary element for shifting said casing to move said connecting means into active position.

4. In an agricultural implement, mechanism including a normally rotatable element and a normally stationary element, means optionally connecting said elements, a casing enclosing said mechanism and having limited movement relative to said stationary element, means connecting said casing with said connecting means whereby said casing controls said connecting means, spring means extending between said casing and said normally stationary element for shifting said casing to move said connecting means into active position, and releasable means acting against both said normally stationary element and said casing for normally holding said casing against movement under the bias of said spring means.

5. Clutch mechanism comprising means serving as a rockable casing, a constantly rotatable driving member extending into said casing means, a driven member disposed within and including a part extending out of said casing means, controllable mechanism within said casing for optionally connecting said members in driving relation, and means connecting said casing with said controllable mechanism for controlling the latter by rocking movement of the casing.

6. Clutch mechanism comprising means serving as a casing, a constantly rotatable driving part extending into said casing means at one side thereof and provided with a peripheral set of notches, a driven part extending out of said casing means at the other side thereof and provided within the interior of said casing means with a part mounted adjacent the inner portion of said driving part, sealing means between opposite sides of said casing means and driving and driven parts, a connecting member connected at one end to said driven member and carrying a roller at the other end adapted to enter one of the notches, whereby to connect said driving and driven parts in driving relation, and means connecting said member and said casing whereby the position of said casing controls the position of said connecting member.

7. In an agricultural machine having a crank axle, a clutch comprising driving and driven clutch members mounted for rotation on said crank axle, shiftable means for optionally connecting said members in driving relation, a casing disposed about said crank axle and movable relative to one of said members, said casing having sealing means engaging said members and said casing enclosing said members and said shiftable means, means fixed to said casing and engageable with said shiftable means whereby relative movement between said casing and said shiftable means acts through the latter to connect and disconnect said members, and means on said machine for controllably restraining movement of said casing.

8. A self-interrupting clutch comprising a pair of rotatable members one having a flange provided with a plurality of external notches and the other member being rotatable about an axis that coincides with the axis of rotation of said one member, a connecting member pivoted at one end on said other member at a point adjacent the periphery of said notched flange and extending across said other member in the general direction of rotation thereof, a part at the other end of said connecting member to engage in one of the notches of said one member, a casing rotatable about the axis of said members, and a connection between said casing and said other end of the connecting member whereby relative movement of said casing in one direction or the other relative to said other member moves said part into and out of engagement with one of the notches of said one member.

9. A self-interrupting clutch comprising a rotatable driving member having a flange provided with a plurality of external notches, a driven member rotatable about an axis that coincides with the axis of rotation of said driving member and having a flange adjacent said driving member, a connecting member comprising a pair of straps, each pivoted at one end to the flange of said driven member, one of said straps being disposed at the side of said notched flange opposite the flange on the driven member and the other strap being disposed on the opposite side of the flange of the driven member opposite the notched flange of the driving member, a roller carried by said straps and engageable with the notched flange of said driving member whereby the drive is transmitted to the driven member, a rockable casing enclosing said driving and driven members, and means on the casing extending generally inwardly into the interior thereof for engaging and disengaging the connecting member with the notched flange of the driving member when said casing is rocked relative to said driven member.

10. Clutch mechanism for agricultural implements or the like, comprising driving and driven members, a swingable clutch dog on one of said members and optionally engageable with the other to connect said members in driving relation, a casing disposed about said members and the clutch dog, means for causing said casing to rotate with said driven member but providing for a limited amount of movement of the casing relative to said driven member, a connection between said casing and said dog for causing said relative movement between the casing and the driven member to control the position of said clutch dog, and releasable means for holding the casing and the driven member against relative movement so as to hold said dog disengaged from said other member.

11. Clutch mechanism comprising a constantly rotatable member, an intermittently rotatable member, means for connecting and disconnecting said intermittently rotatable member with said constantly rotatable member, including a controller movable with said intermittently rotatable member but having relative movement with respect thereto, said controller being in engagement therewith when said constantly rotatable member is disconnected from said intermittently rotatable member, and means for engaging said controller so as to prevent rotation of said intermittently rotatable member so long as said members are disconnected.

12. Clutch mechanism comprising a constantly rotatable member, an intermittently rotatable member and including a lifting crank, means for connecting and disconnecting said intermittently rotatable member with said constantly rotatable member including a controller movable relative to said intermittently rotatable member into a position, when said constantly rotatable member is disconnected from said intermittently rotatable member, contacting said intermittently rotatable member so as to prevent rotation of said intermittently rotatable member and said lifting crank at that time, and trip means controlling the movement of said controller and engageable with said controller to cause contact of the latter with said intermittently rotatable member and to hold said controller against rotation.

13. Clutch mechanism for an agricultural machine having means to be raised and lowered, said clutch mechanism comprising a driving member, a driven member adapted to be connected with said means, controllable means adapted to connect said members, a casing normally movable with said driven member enclosing said mechanism and connected with said controllable means whereby movement of said casing relative to said driven member controls said controllable means, resilient means connecting said driven member and casing tending to move the latter in one direction relative to said driven member into a position to connect said members, and means engageable with the casing for moving the casing against the action of said resilient means relative to said driven member, so as to shift said controllable means into and hold the latter in a position disconnecting said members.

14. Clutch mechanism for an agricultural machine having clutch members for raising and lowering a part of said machine, said clutch mechanism comprising driving and driven clutch members, shiftable means for optionally connecting said members in driving relation, a casing disposed about said clutch members and movable relative to one of said members, said casing enclosing said members and said shiftable means, means fixed to said casing and engageable with said means whereby relative movement between said casing and said shiftable means acts through the latter to connect and disconnect said members, and means on said machine movable into a position restraining movement of said casing in one direction, whereby said shiftable means is held in a position disconnecting said driving and driven clutch members.

15. Clutch mechanism for an agricultural machine having clutch members for raising and lowering a part of said machine, said clutch mechanism comprising driving and driven clutch members, shiftable means for optionally connecting said members in driving relation, a casing disposed about said clutch members and movable relative to one of said members, said casing enclosing said members and said shiftable means, means fixed to said casing and engageable with said means whereby relative movement between said casing and said shiftable means acts through the latter to connect and disconnect said members, means on said machine movable into a position restraining movement of said casing, and a part on said driven member also engageable by said last mentioned means when the latter engages the casing, whereby said shiftable means is held in a position disconnecting said driving and driven clutch members.

16. Clutch mechanism for an agricultural machine having clutch members for raising and lowering a part of said machine, said clutch mechanism comprising driving and driven clutch members, shiftable means for optionally connecting said members in driving relation, a casing disposed about said clutch members and movable relative to one of said members, said casing enclosing said members and said shiftable means, means fixed to said casing and engageable with said means whereby relative movement between said casing and said shiftable means acts through the latter to connect and disconnect said members, means on said machine movable into a position restraining movement of said casing, and a part on the driven member engageable by said last mentioned means when the latter engages the casing, whereby said shiftable means is held in a position disconnecting said driving and driven clutch members.

17. Clutch mechanism comprising means serving as a rotatable crank member, means supporting said crank member for rotation about an axis, a pair of coaxial driving and driven members mounted for rotation about an axis coinciding with said first mentioned axis, said driven member being fixed to rotate with said rotatable crank member, a clutch dog pivoted to one of said members and engageable with the other for operatively connecting said members, a rockable casing enclosing said mechanism and at least the adjacent portions of said driving and driven members, means on said casing adapted upon movement of the latter to operate said dog, and means serving to hold said casing against rotation so as to hold said clutch dog in disengaged relation.

18. A self-interrupting clutch comprising a rotatable driving member having a plurality of external notches, a driven member rotatable about an axis that coincides with the axis of rotation of said driving member, a connecting member pivoted at one end to said driven member, a roller carried by said connecting member and engageable with the notched portion of said driving member whereby the drive is transmitted to the driven member, a rockable casing enclosing said driving and driven members, and means on the casing extending generally inwardly into the interior thereof for engaging and disengaging the connecting member with the notched portion of the driving member when said casing is rocked relative to said driven member.

19. A self-interrupting clutch comprising a rotatable driving member having a plurality of external notches, a driven member rotatable about an axis that coincides with the axis of rotation of said driving member, a connecting member pivoted at one end to said driven member, means on said connecting member and engageable with the notched portion of said driving member whereby the drive is transmitted to the driven member, a rockable casing enclosing said driving and driven members, a slotted extension on the rockable casing and extending generally inwardly into the interior thereof, and a roller on said connecting member and disposed in the slotted extension on the casing for engaging and disengaging the connecting member with the notched portion of the driving member when said casing is rocked relative to said driven member.

20. Clutch mechanism comprising a driven member including a hub and a flange movable therewith, a driving member journaled for rotation on said driven member and also including a hub and a flange, the flanges of said members being disposed adjacent one another, one of said flanges being provided with a plurality of notches, connecting means movably mounted on the other flange and adapted to be moved into a position to engage said notches whereby to connect said driving and driven members together, spring means normally urging said connecting means into a position connecting said driving and driven members, a rockable casing mounted on the hub sections of said members in lubricant tight engagement, and means fixed to the casing on the interior thereof for controlling the position of said connecting means.

21. A self-interrupting clutch comprising axially aligned driving and driven members, one of said members having a flange provided with external peripheral scallops, a roller-supporting strap pivoted adjacent one end to the other member, a roller mounted on said strap adjacent the other end and adapted to engage in one of said external scallops, said members being rotatable in a direction to stress said strap principally in tension when one of said members drives the other, a rockable casing disposed about said members and said roller and strap, and means carried by the casing and acting against the roller whereby relative movement between said casing and said other member in said one direction causes said roller to engage said scallops.

22. A self-interrupting clutch comprising a rotatable driving member in the form of a casting having a hub and a peripheral section provided with a plurality of generally radially outwardly facing notches, a driven member having a radially extending part and a hub, a connecting member pivoted at one end to said radially extending part of said driven member and having means at its other end movable into engagement with one of the notches on said driving member, said connecting member extending from its point of pivotal connection with said driven member generally in the direction of rotation of the latter, whereby the transmission of the drive to the driven member from the driving member stresses the latter in compression and said connection member in tension, an enclosing casing having sealing engagement with the hubs of said driving and driven members and rockable about the axis thereof, and means carried by the casing and acting against said connection member whereby movement of said casing controls said connection member.

23. Clutch mechanism comprising means serving as a rotatable crank member, means supporting said crank member for rotation about an axis, a pair of coaxial driving and driven members mounted for rotation about an axis coinciding with said first mentioned axis, said driven member being fixed to rotate with said rotatable crank member, a clutch dog pivoted to one of said members and engageable with the other for operatively connecting said members, a rockable casing enclosing said mechanism and at least the adjacent portions of said driving and driven members, means on said casing adapted upon movement of the latter to operate said dog, and means serving to hold said casing against rotation so as to hold said clutch dog in disengaged relation.

WALTER H. SILVER.